United States Patent
Mager et al.

(10) Patent No.: US 7,792,962 B2
(45) Date of Patent: Sep. 7, 2010

(54) SYSTEM AND METHOD FOR MANAGING PROVISION OF COMMERCIAL PRODUCTS AND SERVICES IN A BUILDING

(75) Inventors: Scott Mager, New York, NY (US); Jeffrey C. Friedman, New York, NY (US)

(73) Assignee: Short Path, Inc., New York, NY (US)

( * ) Notice: Subject to any disclaimer, the term of this patent is extended or adjusted under 35 U.S.C. 154(b) by 936 days.

(21) Appl. No.: 09/960,996

(22) Filed: Sep. 25, 2001

(65) Prior Publication Data

US 2002/0038356 A1     Mar. 28, 2002

Related U.S. Application Data

(60) Provisional application No. 60/234,776, filed on Sep. 25, 2000.

(51) Int. Cl.
G06F 15/173 (2006.01)
(52) U.S. Cl. .......................... 709/225; 709/224; 705/14
(58) Field of Classification Search ................ 709/200, 709/203, 218, 219, 223–226, 229; 705/22, 705/26, 28, 27, 14
See application file for complete search history.

(56) References Cited

U.S. PATENT DOCUMENTS

| | | | |
|---|---|---|---|
| 5,895,454 A * | 4/1999 | Harrington | 705/26 |
| 6,157,943 A * | 12/2000 | Meyer | 709/203 |
| 6,324,522 B2 * | 11/2001 | Peterson et al. | 705/26 |
| 6,405,176 B1 * | 6/2002 | Toohey | 705/26 |
| 6,437,691 B1 * | 8/2002 | Sandelman et al. | 340/506 |
| 6,556,975 B1 * | 4/2003 | Wittsche | 705/26 |
| 6,598,056 B1 * | 7/2003 | Hull et al. | 707/10 |
| 6,669,832 B1 * | 12/2003 | Saito et al. | 705/26 |
| 6,839,683 B1 * | 1/2005 | Walker et al. | 705/14 |
| 6,968,513 B1 * | 11/2005 | Rinebold et al. | 715/854 |
| 7,174,453 B2 * | 2/2007 | Lu | 713/154 |
| 7,188,080 B1 * | 3/2007 | Walker et al. | 705/14 |
| 7,590,723 B2 * | 9/2009 | Mager et al. | 709/224 |
| 2002/0038341 A1 * | 3/2002 | Mager et al. | 709/203 |

OTHER PUBLICATIONS

Rich, Mokoto. "Office Buildings Hope Tenants Are Shoppers On New portals", Mar. 30, 2000. Wall Street Journal, NY,NY. p. B1.*

* cited by examiner

Primary Examiner—Ramy M Osman
(74) Attorney, Agent, or Firm—Stroock & Stroock & Lavan LLP

(57) ABSTRACT

A system and method for managing provision of products and services in a building by providing a portal for a building accessible via the Internet having vendors associated with the portal based upon specific needs of the building. Orders are received from a user of the portal and the user is provided with status information for the orders. The portal is designed to suit the specific needs of a building.

2 Claims, 6 Drawing Sheets

Figure 1:
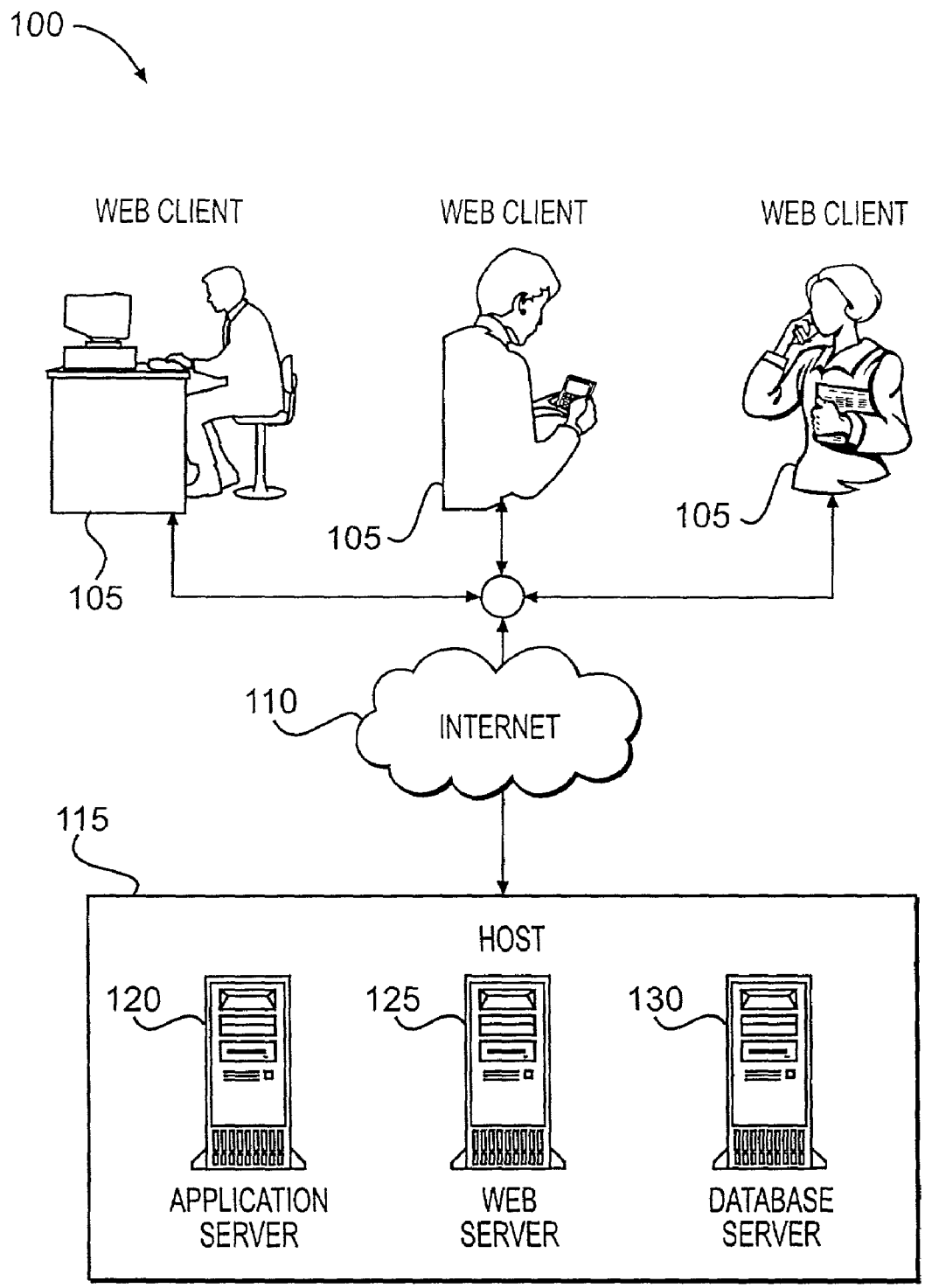

SYSTEM AND METHOD FOR MANAGING PROVISION OF COMMERCIAL PRODUCTS AND SERVICES IN A BUILDING

CROSS-REFERENCE TO RELATED APPLICATION

This application relates to and claims priority of Provisional Application Ser. No. 60/234,776 filed on Sep. 25, 2000, and entitled "System and Method for Managing the Provision of Commercial Products and Services in a Building."

BACKGROUND OF THE INVENTION

Field of the Invention

The present invention relates to system and method for managing the provision of commercial products and services in a building. More particularly, the invention is directed to managing the provision of commercial products and services in a building using the Internet to provide an integrated system and method for order entry and feedback with respect to the products and services required in a building.

It is estimated that there are over 10 million office managers in the United States, who have control over approximately $200 billion in annual spending, most of which is for large commercial office buildings. In this, office managers or administrators order commercial products and services, such as cleaning, office supplies, staffing, and catering. Interacting with numerous personnel in a large building, who actually request the products and/or services to be ordered, is a time consuming, inefficient, and cumbersome task for most office administrators.

The management of offices in a building network involves numerous functions, each of which is performed by specific personnel. For example, an office administrator or manager is usually responsible for setting budgetary limits on office users, whereas a building administrator is usually responsible for allocating offices to the tenants of the building.

Office personnel such as office managers, secretaries, and purchasing managers are responsible for ordering commercial products and services for their respective offices. Commercial products and services include office supplies, reservations, limousine services, and messenger service. Unfortunately, existing processes for ordering such commercial products and services are inefficient. For example, office managers expend a great deal of valuable time arranging orders with various vendors via phone, fax, or mail. Further, existing processes are not designed to suit the specific needs of a particular building.

Recent advancements in the Internet have brought, via the World Wide Web (the "Web"), a potential to automate many of the manual processes executed daily by people in large commercial office buildings, such as office administrators, office workers, and maintenance personnel. In this, a portal is a Web "super-site" providing access to a variety of integrated services including Web searching, news, white and yellow pages directories, e-mail, discussion groups, online shopping and hyperlinks to other Web sites. A portal is the Web equivalent to the original integrated online services such as CompuServe and AOL. Unfortunately, portals in the prior art are not designed to suit the specific needs of a particular building.

Accordingly, it would be desirable to provide a system and method for managing the provision of commercial products and services in a building, which streamline the process of purchasing commercial products and services in a building. In this, it would be highly desirable to provide successful integration of such processes with the Web, for example, by means of a portal for a building, which would fundamentally change the way offices utilize their resources and budget their time, resulting in a highly efficient process and substantial economic savings.

The difficulties, limitations and desires suggested in the preceding are not intended to be exhaustive, but rather are among many which demonstrate that prior art systems and methods for managing the provision of commercial products and services in a building will admit to worthwhile improvement.

OBJECTS OF THE INVENTION

It is, therefore, a general object of the invention to provide a system and method for managing the provision of commercial products and services in a building, which streamline the process of purchasing commercial products and services in a building thereby obviating or minimizing difficulties of the type previously described.

It is another general object of the invention to provide a system and method for managing the processes for providing commercial products and services in a building, which integrate the processes with the Web.

It is a specific object of the invention to provide a system and method for managing the provision of commercial products and services in a building using a Web-based portal for a building, resulting in a highly efficient process and substantial economic savings.

It is another specific object of the invention to provide a system and method for managing the provision of commercial products and services in a building network system.

It is yet another specific object of the invention to provide a system and method for managing the provision of commercial products and services in a building which automatically differentiate user roles in a building.

It is yet another specific object of the invention to provide a building network system for managing the provision of commercial products and services in a building through a portal designed to suit the specific needs of the building.

It is yet another specific object of the invention to provide a process of using a building network system to create a portal designed to suit the specific needs of a building for managing the provision of commercial products and services in the building.

It is yet another specific object of the invention to provide a system and method for managing the provision of commercial products and services in a building by using a Web-based portal to order commercial products and services for the building.

It is another specific object of the invention to provide a system and method for managing the provision of commercial products and services in a building which track and monitor orders made through a Web-based portal.

It is yet another specific object of the invention to provide a system and method for managing the provision of commercial products and services in a building which utilize a computer connected with the Internet.

It is another specific object of the invention to provide a system and method for managing the provision of commercial products and services in a building with a computer system accessible via the Internet.

SUMMARY OF THE INVENTION

To achieve at least some of the foregoing objects, the invention provides a method for managing provision of products and services in a building by providing a portal for a building accessible via the Internet. At least one vendor of items of interest to the building is associated with the portal for the building, which is determined based upon specific needs of the building. Orders for the items of interest to the building are received from a user of the portal and the user of the portal is provided with status information of the orders.

The portal for a building includes a home page for each user of the portal and each user is uniquely identified and has a specific user role with respect to the portal for a building. Vendors are assigned to respective vendor categories and selected vendors from the vendor categories are associated with a home page for each user based upon predetermined criteria for a building. A link is provided to the vendor categories on a home page for each user such that a user selects a vendor from the associated selected vendors via the vendor categories link.

Order parameters for each user are specified and a determination of whether or not approval is necessary after receiving orders for items of interest from a user is made based upon the specified order parameters. A user is notified whether or not the received orders have been approved.

A vendor is notified of orders received from a user and a status of each order is received from the vendor for notifying the user of the status of each order.

In a preferred embodiment of the present invention, the building is a building network.

A user is provided with access to an anonymous user home page and a determination is made whether the user is one of a building user and a vendor user. Data input by the user with respect to a user profile is received and the data is processed to create one of a building user home page and a vendor user home page. The processing of data includes creating vendor categories and assigning vendors to the vendor categories. The processing data also includes providing a home page for each user of the portal for a building and uniquely identifying each user having a specific user role with respect to the portal for a building.

A system for managing the provision of products and services in a building is provided by having at least one server accessible via a communications network. The server provides a portal for a building accessible by one or more user via the communications network and having at least one vendor of items of interest to the building associated with the portal for the building. The vendor being determined based upon specific needs of the building. The server includes a receiving module that is operable to receive orders for the items of interest to the building from the one or more user of the portal; a transmitting module that is operable to provide the one or more user of the portal with status information of the orders; and a database that is operable to store a user profile for each of the one or more user of said portal and a vendor profile for each of the at least one vendor.

The portal for a building includes a home page for each of the one or more users of the portal and each user is uniquely identified and has a specific user role with respect to the portal for a building. In a preferred embodiment of the invention, the building is a building network and the communications network is the Internet

DRAWINGS

Figure 2A:
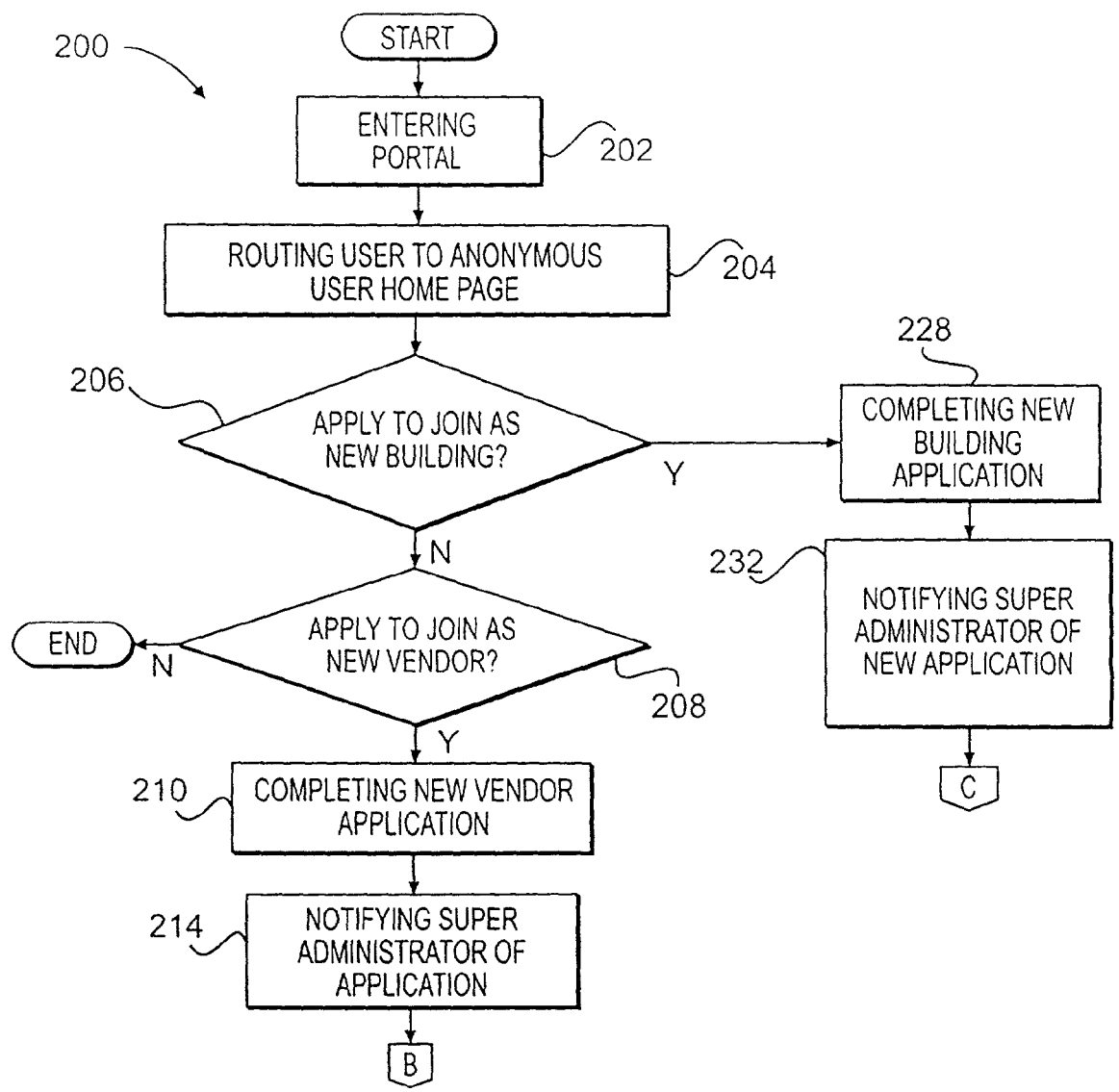
Figure 2B:
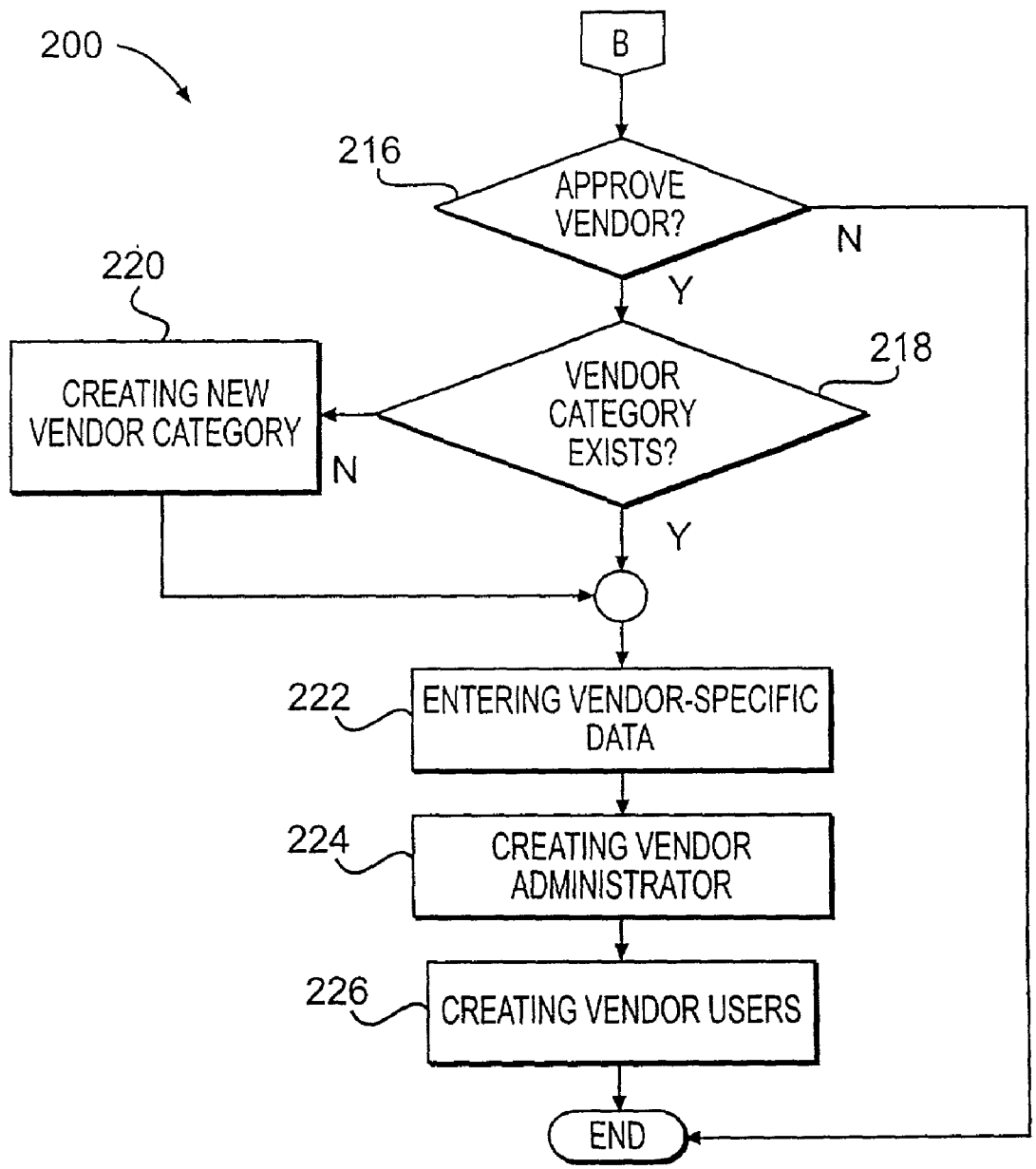
Figure 2C:
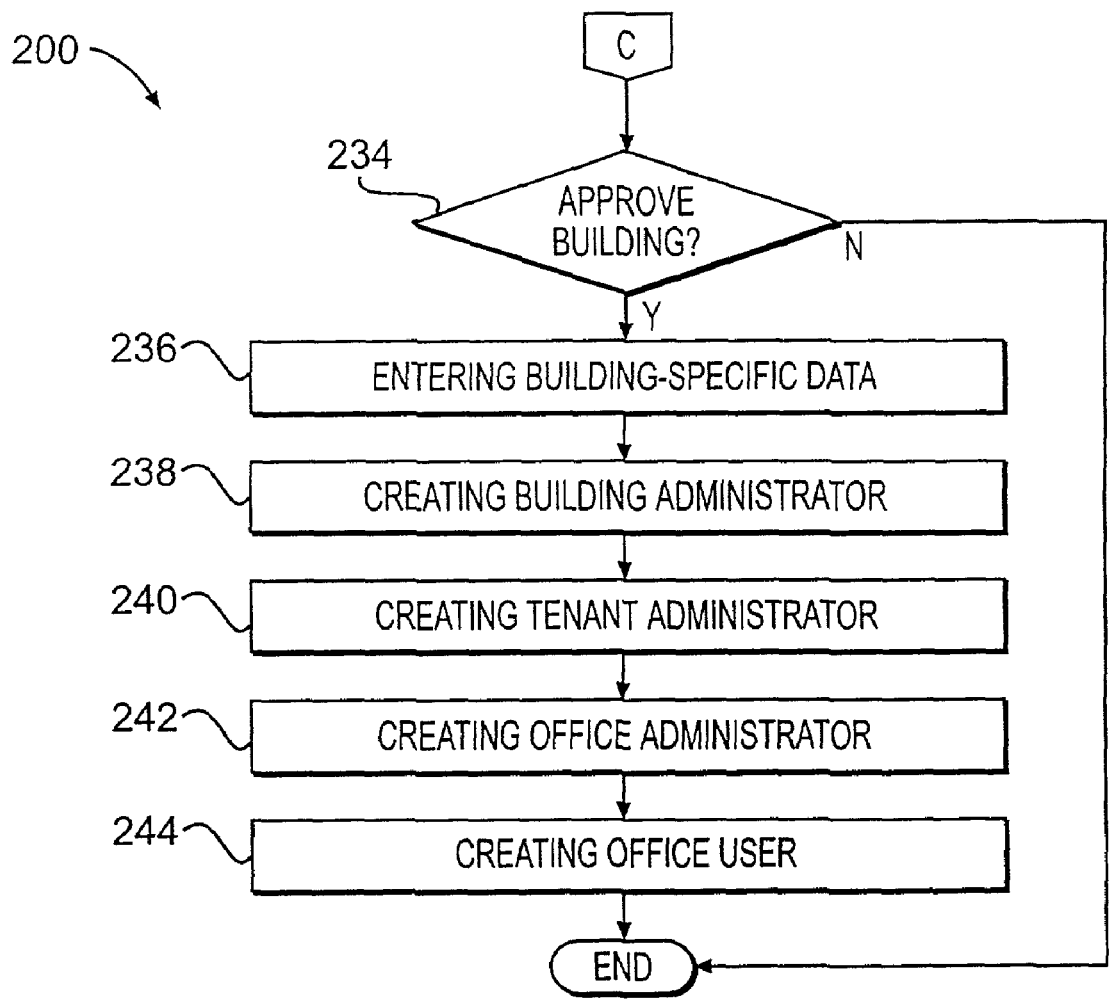
Figure 3:
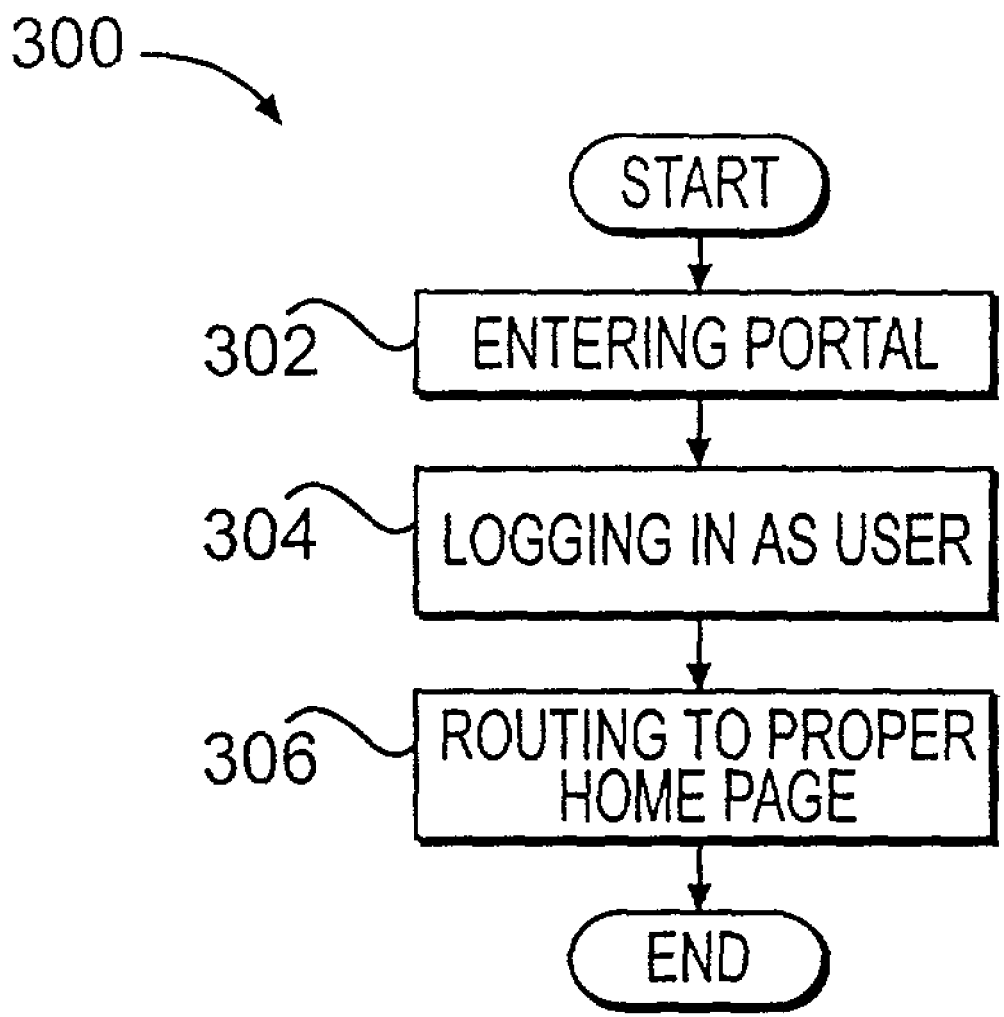
Figure 4:
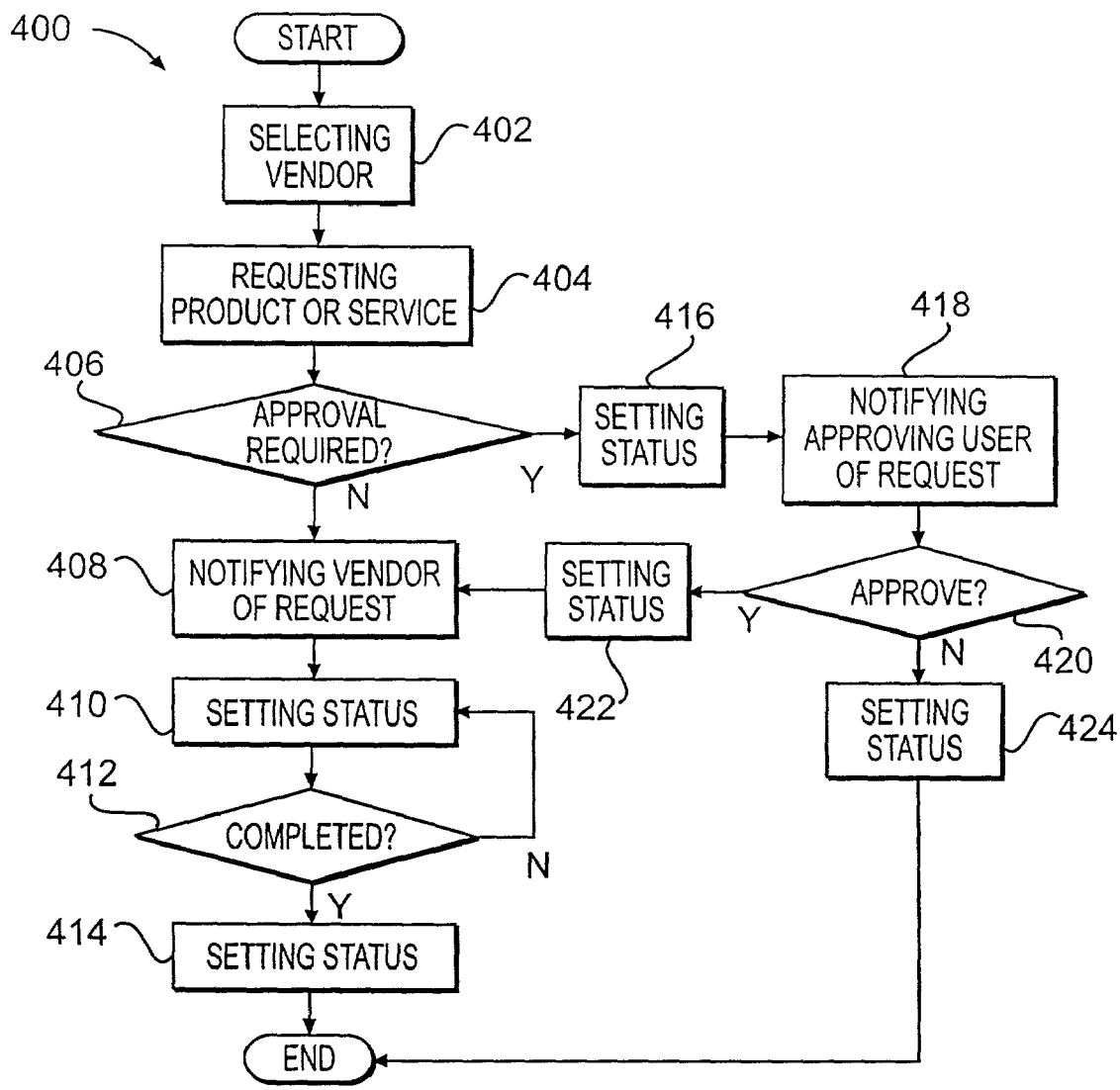

Other objects and advantages of the present invention win become apparent from the following detailed description of preferred embodiments thereof taken in conjunction with the accompanying drawings, wherein:

FIG. 1 shows schematically a building network system for managing the provision of commercial products and services in a building according to a preferred embodiment of the present invention;

FIG. 2A-C are schematic representations of a process for creating a portal for managing the provision of commercial products and services in a building according to a preferred embodiment of the present invention;

FIG. 3 is a schematic depiction of a process for accessing a user home page according to a preferred embodiment of the present invention; and FIG. 4 shows a schematic representation of a process for managing the provision of commercial products and services in a building according to a preferred embodiment of the present invention.

DETAILED DESCRIPTION

Referring to FIG. 1, a building network system 100, according to a preferred embodiment of the present invention, includes one or more Web clients 105, the Internet 110, and a host 115. Web clients 105 include any conventional system for accessing the Internet, such as a personal computer with a Web browser, personal digital assistant (PDA) including a Web browser, and cellular telephone further including a wireless application protocol (WAP) based browser.

Host 115 further includes elements commonly employed by most internet service providers (ISPs), such as an application server 120, Web server 125, and database server 130. Host 115 further provides a Web-based portal.

As used herein, a portal is a Web "super-site" providing access to a variety of integrated services including, for example, Web searching, news, white and yellow pages directories, e-mail, discussion groups, online shopping and hyperlinks to other Web sites. A portal is the Web equivalent of the original integrated online services such as CompuServe and AOL. Although the term portal initially referred to general-purpose Web sites, it now commonly refers to vertical market Web sites offering related services to a particular industry such as banking, insurance or computers. In this sense, the present invention relates to a portal for a building.

Each user of system 100 falls into a predefined role. Each role provides specific functionality as described below. User roles include, for example, super administrator, building administrator, tenant administrator, office administrator, office user, vendor administrator, vendor user, and anonymous user.

By default, host 115 is configured to allow access of a user corresponding to the anonymous user role through a Web client 105 via the Internet 110. The anonymous user role allows public access to the portal. Host 115 further provides a home page for an anonymous user to access (refer to FIG. 3).

By default, host 115 is configured to allow access of a user corresponding to the super administrator role through a Web client 105 via the Internet 110. In particular, database server 130 contains a user name and password for a super administrator. Host 115 provides a home page for a super administrator to access (refer again to FIG. 3).

Through their home page, a super administrator can perform any function of the system 100 and is responsible for managing all aspects of the system 100. This includes the management of certain aspects of all other users of the system 100. When creating a new user, the super administrator enters data into the database server 130 including the following data elements:

E-mail address (doubles as a user name)
Temporary password (user is asked to pick a new password upon first login to the system)
User role
Password hint
First name
Middle Name/Initial
Last name
Company
Department
Title
E-mail
Home Phone
Work Phone
Mobile Phone
Pager
Fax
Address 1
Address 2
City
State
Zip
Gender
Birth date
Marital Status
Number of children
Income bracket
Education level Referring to FIGS. 2 A-C, a process 200 for creating a portal for a building includes:

Step 202: Entering Portal (FIG. 2A)

In step 202 (note FIG. 2A), a user enters the portal residing on host 115 through a Web client 105 and the Internet 110. In particular, a user accesses the portal by entering the uniform resource locator (URL) of the portal into a browser on their Web client 105. By default, host 115 assigns the anonymous user role to the user.

For reasons of simplicity, this step refers to the term portal although the state of the portal is not yet fully built out.

Step 204: Routine User to Anonymous User Home Page

In step 204, the user is routed to an anonymous user home page residing on the host 115 via a hyperlink on the portal.

Step 206: Apply to Join as New Building?

In step 206, the anonymous user decides whether to join as a new building. If yes, then the process 200 proceeds to step 228; if no, then the process 200 proceeds to step 208.

Step 208: Apply to Join as New Vendor?

In step 208, the anonymous user decides whether to join as a new vendor. If yes, then the process 200 proceeds to step 210; if no, then the process 200 terminates.

Step 210: Completing New Vendor Application

In step 210, the anonymous user completes a new vendor application by entering required data into the fields of an online new vendor application form. The anonymous user enters data into the database server 130 including the following data elements:
  Contact Name
  Contact Information
  Vendor name
  Vendor Description
  Vendor category The database server 130 associates a unique identification (ID) code with the data.

Step 214: Notifying Super Administrator of Application

In step 214, the process 200 notifies the super administrator of the application for a new vendor via an e-mail message containing a hyperlink to the portal and the ID code assigned in step 210. The super administrator logs onto the portal as described in connection with FIG. 3 below. From their home page, the super administrator enters the ID code into a text field and submits the ID code to the host 115. The host 115 then serves a Web page containing the new vendor application data entered in step 210.

Step 216: Approve Vendor? (FIG. 2B)

In step 216 (note FIG. 2B), the super administrator reviews the new vendor application data and decides whether to approve the new vendor. If yes, then the process 200 proceeds to step 218; otherwise, the process 200 terminates. If approved, the super administrator will contact the vendor representative identified in step 210 directly via phone in order to work out any specific details associated with the approval.

Step 218: Vendor Category Exists?

In step 218, the super administrator determines if a vendor category exists for the new vendor. In particular, the super administrator searches the database server 130 to determine if a record containing the appropriate vendor category exists. Vendor categories include those used by users of office buildings, such as food service, limousine service, office supplies, and the like. If no, then the process 200 proceeds to step 220; if yes, then the process 200 proceeds to step 222.

Step 220: Creating New Vendor Category

In step 220, the super administrator creates a new vendor category in the database server 130 corresponding to the new vendor. In particular, the super administrator can add, edit, and remove categories of vendors in the database server 130. All vendors will fall into specific categories (e.g., cleaning service, office supplies, and furniture). Vendor categories affect the way vendors are depicted on-screen and help determine which vendors are appropriate for which buildings. When adding a vendor category, the super administrator enters data into the database server 130 including the following data elements:
  Category Name
  Category Description Step 222: Entering Vendor-Specific Data In step 222, the super administrator enters data into the database server 130 including the following vendor-specific data elements:
  Name
  Vendor Category
  Short description
  Long description
  Address 1
  Address 2
  City
  State
  Zip
  Main phone number
  Primary contact
  Primary contact phone number Optionally, the super administrator can enter data into the database server 130 including the following data elements:
  Primary contact e-mail
  Primary contact fax
  Secondary contact
  Secondary contact phone
  Secondary contact e-mail Secondary contact fax
Website URL
Logo
Global specials
Tenant specials
Union status Step 224: Creating Vendor Administrator In step 224, the super administrator configures the host 115 to allow access of a user corresponding to the vendor administrator role through a Web client 105 via the Internet 110. In particular, the super administrator creates an e-mail account for a vendor administrator on host 115. The super administrator then stores a user name and temporary password in the database server 130 corresponding to the vendor administrator. The super administrator then sends an e-mail message to the e-mail account of the vendor administrator. The e-mail message contains the temporary password, a hyperlink to the portal, and directions for accessing the new user's home page (refer to FIG. 3).

Through their home page, a vendor administrator presents products and services to users of system 100 and manages orders of products and services requested by users of the system 100 as described in connection with FIG. 4 below. In particular, a vendor administrator typically views pending orders, sets the status of orders, and downloads order information in a spreadsheet format. The system 100 allows a vendor administrator to group orders by tenant, building, date, order status, or any combination thereof.

Step 226: Creating Vendor Users

In step 226, the super administrator configures the host 115 to allow access of a user corresponding to the vendor user role through a Web client 105 via the Internet 110. In particular, the super administrator creates an e-mail account for a vendor user on the host 115. The super administrator then stores a user name and temporary password in the database server 130 corresponding to the vendor user. The super administrator then sends an e-mail message to the e-mail account of the vendor user. The e-mail message contains the temporary password, a hyperlink to the portal, and directions for accessing the new user's home page (refer again to FIG. 3).

Additionally, in another embodiment of this functionality, the Vendor Administrator can access through their home page Step 226, and configure host 115 to create a vendor user by accessing Step 226 through Internet 110.

Through their home page, a vendor user assists the vendor administrator in managing orders requested by users of the system 100 as described below in connection with FIG. 4. In particular, a vendor user has the capability to view pending orders, set order status, and download order information in a spreadsheet format. The configuration of host 115 allows a vendor user to group orders by tenant, building, date, order status, or any combination thereof.

Step 228: Completing New Building Application (FIG. 2A)

In step 228 (note again FIG. 2A), the anonymous user completes a new building application by entering required data into the fields of an online new building application form. An anonymous user requesting to join as a new building would likely be a representative of a building management organization (BMO) or a building owner.

The anonymous user enters data into the database server 130 including the following data elements:
Name
Contact Information
Building name
Building address Database server 130 associates a unique ID code with the data.

Step 232: Notify Super Administrator of Application

In step 232, the process 200 notifies the super administrator of the application for a new building via an e-mail message containing a hyperlink to the portal and the previously assigned ID code assigned in step 228. The super administrator logs onto the portal as described in connection with FIG. 3. From their home page, the super administrator enters the ID code into a text field and submits the ID code to the host 115. The host 115 then serves a Web page containing the new building application data entered in step 228.

Step 234: Approve Building? (FIG. 2C)

In step 234 (note FIG. 2C), the super administrator decides whether to approve the new building. If yes, then the process 200 proceeds to step 236; if no, the process 200 terminates. If approved, the super administrator will contact the building representative identified in step 228 directly via a phone in order to work out any specific details associated with the approval.

Step 236: Entering Building-Specific Data

In step 236, the super administrator enters data into the database server 130 including the following data elements:
Address 1
Address 2
City
State
Zip
Tenants
    Company Name
    Description
    Business Type In particular, a tenant is an organization that rents space within a building.

Step 238: Creating Building Administrator

In step 238, the super administrator configures the host 115 to allow access of a user corresponding to the building administrator role through a Web client 105 via the Internet 110. In particular, the super administrator creates an e-mail account for a building administrator on the host 115. The super administrator then stores a user name and temporary password in the database server 130 corresponding to the building administrator. The super administrator then sends an e-mail message to the e-mail account of the building administrator. The e-mail message contains the temporary password, a hyperlink to the portal, and directions for accessing the new user's home page (refer to FIG. 3).

Through their home page, a building administrator enters data into the database server 130 including the following building-related data elements:
Address
Name (of the building)
Owner
Photo
Square Feet
Floors
Elevators
Date built
Parking
Hours of operation
Freight hours
Delivery hours
Delivery rules Rules+Regulations
Work Rules
Work Regulations
Union status
Managing Agent
  Name
  Address
  Phone/Fax
  E-mail
  Contact
Staff
  Building Manager
  Assistant Building Manager
  Concierge
  Engineers
  Porters
  Fire Safety Director(s)
Leasing Agent
  Name
  Address
  Phone/Fax
  E-mail
  Contact
Cleaning Contractor
  Name
  Address
  Phone/Fax
  Contact
Has parking?
Can use roof?
Loading dock
Fire contact
EMS Contact
Police contact
Type of security system
Management company
Available space
  Each available space entry must specify the floor number, square footage, and a description of the space.
Vendors
  The building administrator selects appropriate vendors from a global collection of vendors in the database server 130 and makes them available to the users in a particular building. By default, all vendors will be available to all users in the building.

A super administrator repeats this step as needed to create additional building administrators.

Alternatively, a super administrator can perform the functions of the building administrator.

Step 240: Creating Tenant Administrator

In step 240, the building administrator configures the host 115 to allow access of a user corresponding to the tenant administrator role through a Web client 105 via the Internet 110. In particular, the building administrator creates an e-mail account for a tenant administrator on the host 115. The building administrator then stores a user name and temporary password in the database server 130 corresponding to the tenant administrator. The building administrator then sends an e-mail message to the e-mail account of the tenant administrator. The e-mail message contains the temporary password, a hyperlink to the portal, and directions for accessing the new user's home page (refer to FIG. 3).

Since tenants may span multiple buildings, this role is reserved for a tenant employee who is capable of making corporate-wide (not office-wide) decisions about purchasing, vendor relationships, etc.

A building administrator repeats this step as needed to create additional tenant administrators.

Step 242: Creating Office Administrator

In step 242, the tenant administrator configures the host 115 to allow access of a user corresponding to the office administrator role through a Web client 105 via the Internet 110. In particular, the tenant administrator creates an e-mail account for an office administrator on the host 115. The tenant administrator then stores a user name and temporary password in the database server 130 corresponding to the office administrator. The tenant administrator then sends an e-mail message to the e-mail account of the office administrator. The e-mail message contains the temporary password, a hyperlink to the portal, and directions for accessing the new user's home page (refer to FIG. 3).

Through their home page, an office administrator enters data corresponding to their particular office into the database server 130, including the following data elements:
  Contact Information
  Facility Manager Contact Information
  Purchasing Manager Contact Information
  Number of employees
  Internet access speed
  Number of computers
  Fire Warden
  Location of office within building Although a building administrator or tenant administrator can also accomplish this task, it is likely that an office administrator will be in the best position to answer these office-specific questions.

Through their home page, a tenant administrator defines a set of purchasing rules for each office administrator created and stores these rules in the database server 130. For each office administrator created and each vendor the building administrator made available to the building in step 238, the tenant administrator enters data into the database server 130 including the following data elements:
  By default, hyperlinks to vendors made available to a particular building will be included on each office administrator's home page.
Maximum purchase amount the office administrator can make without approval.
  By default, all office administrators will have the capability to make purchases without approval up to an unlimited amount if not predetermined.
Vendor-specific purchasing rules.
  For example, a specific limousine service may only be made available to users after 6:00 PM on weekdays.
Automatic order completion confirmation.
  The tenant administrator determines which vendors require order completion confirmation. For limousine service, or food orders, or other services where the tenant administrator's manual confirmation is not necessary, the tenant administrator selects automatic order completion confirmation.

From their home page, an office administrator periodically views a list of all pending orders generated from users within their particular office. The office administrator views orders based on status (pending, completed, delayed, backordered, out-of-stock, unavailable), date of the order, vendor, or the user generating the order. The office administrator can then generate a printable report or download the data in spreadsheet format for further processing in Excel® or a similar application. Refer to FIG. 4.

A tenant administrator repeats this step as needed to create additional office administrators.

Step 244: Creating Office Users

In step 244, the office administrator configures the host 115 to allow access of a user corresponding to the office user role through a Web client 105 via the Internet 110. In particular, the office administrator creates an e-mail account for an office user on the host 115. The office administrator then stores a user name and temporary password in the database server 130 corresponding to the office user. The office administrator then sends an e-mail message to the e-mail account of the office user. The e-mail message contains the temporary password, a hyperlink to the portal, and directions for accessing the new user's home page (refer to FIG. 3).

Through their home page, the office administrator enters data into the database server 130 including the following data elements related to the new office user:
- E-mail address
- First name
- Last name
- ID (e.g., birthday, or last 4 digits of social security number)

Through their home page, an office administrator defines a set of purchasing rules for the office user created and stores these rules in the database server 130. For the office user created and each vendor the tenant administrator made available to the office administrator, the office administrator enters data into the database server 130 including the following data elements:
- Include hyperlink to vendor's home page on office user's home page?
  - By default, hyperlinks to all of the vendors made available to a particular building will be included on the office user's home page.
- Maximum purchase amount the office user can make without approval.
  - By default, the office user will have the capability to make purchases without approval up to a predetermined amount.
- Vendor-specific purchasing rules.
  - For example, a specific limousine service may only be made available to users after 6:00 PM on weekdays.

To further facilitate the process of creating purchasing rules for an office user, the system 100 allows an office administrator to create purchasing classes and assign an office user to a specific purchasing class. In particular, the host 115 allows an office administrator to create a new purchasing class and assign a specific set of purchasing rules to that purchasing class. For example, one purchasing class may contain a rule that allows the ordering of limousine service only after 6:00 PM, whereas another purchasing class may contain a rule that allows the ordering of limousine service at any time. This information is stored in the database server 130.

An office administrator repeats this step as needed to create additional office users.

Easy as this may be, it would still be tedious for an office administrator to set up an office of 1,000 employees using this method. Therefore, the system 100 allows an office administrator to automatically create a large group of new users by storing in the database server 130 a file containing a list of e-mail addresses. This data is easily accessible since many offices already have a list of employees in spreadsheet or database format. The database server 130 automatically sends an e-mail message to each e-mail address listed. Each e-mail message contains a unique temporary password and a hyperlink to the portal.

Through their home page, an office user orders commercial products and services from any vendor made available to them. In addition, an office user periodically views a list of all pending orders to determine when a particular service has been fulfilled or a product has been delivered (refer to FIG. 4).

Referring to FIG. 3, a process 300 for accessing a user home page comprises the following steps.

Step 302: Entering Portal

In step 302, a user enters a portal residing on the host 115 through a Web client 105 and the Internet 110. In particular, a user accesses the portal by entering the uniform resource locator (URL) of the portal into the browser on their Web client 105.

Step 304: Logging in as Registered User

In step 304, the process 300 allows a user to register using a predefined user name and password. In particular, the user enters a user name and password into a login Web page on the portal. The host 115 authenticates the user name and password. In the event that a new user attempts to register with a temporary password, host 115 prompts the new user to pick a new password and fill out the remainder of his or her profile.

Step 306: Routine to Proper Home Page

In step 306, the process 300 routes the user to the home page corresponding to the user name of the user entered in step 304. The host 115 automatically creates a new user home page for a new user. The user home page consists of several web pages of the portal that are customized specifically for each user.

For example, a user having a role corresponding to an office user would enter a user name and a corresponding password into the appropriate fields within a Web page on the Web client 105. The host 115 then routes the Web browser on the Web client 105 to the home page of the office user.

Referring to FIG. 4, the following describes a process for managing the provision of commercial products and services in a building. A user executes the process 400 from their home page residing on the portal. FIG. 3 depicts the process 300 for accessing a user home page. Any user of the system can purchase products and services as described by process 400. User having authority to view the status of a request can do so via their home page at any time during the process 400. For example, an office administrator can view the status of a request initiated by an office user. Status levels include, for example, pending, approved, denied, back ordered, expected delivery date, and completed.

The process 400 comprises the following steps.

Step 402: Selecting Vendor

In step 402, a user selects a hyperlink to a vendor category from a hyperlink list of vendor categories shown on the user's home page. The host 115 then hyperlinks the user's Web browser to a Web page containing a hyperlink list of available vendors associated with the previously selected vendor category. The user then selects the hyperlink to the desired vendor, and the host 115 hyperlinks the user's Web browser to the vendor's home page within the portal containing a list of products or services offered by the selected vendor.

Step 404: Requesting Product or Service

In step 404, the user requests a product or service offered by the vendor selected in step 402 by selecting the option to request the appropriate product or service from the selected vendor's home page.

In addition to identifying the vendor, the requesting user enters data into the database server 130 including the following data elements:
- Service date
- Service details Product ID number (e.g., SKU, UPC)
Product quantity Step 406: Approval Required?

In step 406, the process 400 determines if the request from step 404 requires approval from another user by applying the requesting user's set of purchasing rules. If the request does not require approval, then the process 400 proceeds to step 408; otherwise, the process 400 proceeds to step 416.

Step 408: Notifying Vendor of Request for Product or Service

In step 408, the process 400 notifies the proper vendor administrator or vendor user of the request for a product or service made in step 404 by storing the request in the database server 130 and making it visible to the proper vendor via their home page. Alternatively, the host 115 could automatically send a facsimile or e-mail to the vendor indicating the detail of the order or a notice to check their home page for the new order.

Step 410: Setting Status

In step 410, the vendor administrator or vendor user sets the status of the request in the database 130 via their home page. Status levels include pending, back ordered, expected delivery date, completed, and denial of request. A change in status causes the host 115 to generate and transmit an e-mail message to the user who generated the order. The e-mail contains a description of the order and the new status of the order.

Step 412: Completed?

In step 412, the requesting user determines if the vendor delivered the requested product or service. If yes, then the process 400 proceeds to step 414; if no, then the process 400 returns to step 410.

Step 414: Setting Status

In step 414, the requesting user sets the status of the request to "complete" via their home page if they agree that the order is complete. The process 400 terminates after step 414.

Step 416: Setting Status

In step 416, the host 115 sets the status of the request in the database 130 to "pending." A change in status causes the host 115 to generate and transmit an e-mail message to the user who generated the order. The e-mail contains a description of the order and the new status of the order.

Step 418: Notifying Approving User of Request

In step 418, the host 115 notifies the proper approving user of the request for a product or service made in step 404 by making it visible to the approving user via their home page.

An alternative embodiment of the present invention allows the approving user to forward the order request to another approving user. For example, one office administrator may forward an order request to another office administrator or tenant administrator for approval.

Step 420: Approve?

In step 420, the approving user determines whether to approve the request. If yes, then the process 400 proceeds to step 422; if no, then the process 400 proceeds to step 424.

Step 422: Setting Status

In step 422, the host 115 sets the status of the request in the database 130 to "approved." A change in status causes the host 115 to generate and transmit an e-mail message to the user who generated the order. The e-mail contains a description of the order and the new status of the order.

Step 424: Setting Status

In step 424, the host 115 sets the status of the request in the database 130 to "denied." A change in status causes the host 115 to generate and transmit an e-mail message to the user who generated the order. The e-mail contains a description of the order and the new status of the order. The process 400 terminates after step 424.

Although the above description of the present invention is directed to a network provided in a building, it can be appreciated that the present invention could also be applied to any type of facility such as a hotel, university campus, government complex, airport, shipping port, factory, amusement park, shopping mall or cruise ship. Further, the present invention could also be applied to a geographical area such as a park containing dispersed facilities, and a body of water whereon ships are dispersed.

Summary of Major Advantages of the Invention

After reading and understanding the foregoing description of preferred embodiments of the invention, in conjunction with the illustrative drawings, it will be appreciated that several distinct advantages of the subject system and method for managing the provision of commercial products and services in a building are obtained.

One advantage of the present invention is a portal designed to suit the specific needs of a particular building. The portal provides a convenient, integrated location for office personnel to efficiently conduct e-commerce with vendors of commercial products and services.

Another advantage of the present invention is a way to automatically differentiate user roles in a building.

Yet another advantage of the present invention is that it saves the user time, money, and effort by reducing time spent traveling, standing in line, and communicating with sales personnel.

In accordance with the foregoing, the present invention provides a system and method for provision of commercial products and services in buildings. By developing strategic partnerships with office supplies companies, janitorial service companies, staffing agencies, building management companies, car services, and the like, the present invention offers online, one-stop shopping for various commercial products and services to various users associated with a building through a portal.

A building is a physical location run by a building management organization (BMO). One building houses many tenants, each tenant occupying one or more offices, and offers the services of many vendors.

A portal is a Web "super-site" providing access to a variety of integrated services including, for example, Web searching, news, white and yellow pages directories, e-mail, discussion groups, online shopping and hyperlinks to other Web sites. A portal is the Web equivalent of the original integrated online services such as CompuServe and AOL. Although the term portal initially referred to general-purpose Web sites, it now commonly refers to vertical market Web sites offering related services to a particular industry such as banking, insurance or computers. In this sense, the present invention relates to a portal for a building.

A first aspect of the present invention is a building network system for managing the provision of commercial products and services in a building through a portal designed to suit the specific needs of the building.

A second aspect of the present invention is a process of using the building network system to create a portal designed to suit the specific needs of a building for managing the provision of commercial products and services in the building.

A third aspect of the present invention is a process of using the portal to order commercial products and services in the building.

A fourth aspect of the present invention is a process of tracking orders made through the portal.

A fifth aspect of the present invention is carrying out the processes according to the present invention in a computer.

A sixth aspect of the present invention is a computer system capable of carrying out the processes according to the present invention.

In describing the invention, reference has been made to preferred embodiments and illustrative advantages of the invention. Those skilled in the art, however, and familiar with the instant disclosure of the subject invention, may recognize additions, deletions, modifications, substitutions and other changes that fall within the purview of the subject invention.

What is claimed:

1. A method for managing provision of commercial products and services in a building by a manager, the method comprising the steps of:
   providing a portal unique to a building, the portal being accessible by at least one tenant and by at least one vendor of said building via at least the Internet, wherein said step of providing a portal for a building includes the step of providing a home page for each tenant or vendor, wherein the home page provides access to particular links and capabilities according to the tenant or vendor, providing public access to an anonymous user home page, receiving data from a person accessing the anonymous user home page, determining whether said person is one of a tenant or a vendor, and processing said data to create one of a tenant home page or vendor home page, wherein said step of processing said data includes the step of creating vendor categories; and assigning one or more vendors to said vendor categories, and wherein the tenant home page or vendor home page provides access to links and capabilities according to the vendor or user;
   receiving, from a plurality of vendors of a variety of commercial services products, requests to be associated with the portal, wherein being associated with the portal includes being identified on a list of vendors from which a tenant of the building can select, the list of vendors being determined by the manager;
   the manager selecting at least one vendor based on the needs of at least one tenant of the building and the manager selectively associating said at least one vendor with said portal for the building;
   providing at said portal at least one offer for at least one commercial service or product for each of said vendors;
   specifying one or more order parameters for each tenant;
   receiving at the portal a request for one or more orders for at least one commercial service or product of a specified vendor from a tenant;
   determining whether or not approval is necessary after receiving orders for one or more of said commercial service or product from a user;
   said determination being made based on said specified order parameters;
   notifying the tenant whether or not said received orders have been approved;
   notifying a vendor of one or more orders received from a tenant;
   receiving from said vendor a status of each order; and
   providing the tenant with status information of said orders during the pendancy of the order.

2. A system for managing provision of products and services in a building, the system comprising:
   at least one server device accessible via a communications network, said at least one server device providing a portal for a building accessible by one or more tenants via said communications network and having at least one vendor of commercial services and products to the building associated with said portal for the building, said at least one vendor being determined based on the needs of at least one tenant of the building;
   said portal including a home page for each tenant and each vendor, said tenant or vendor being uniquely identified and having a specific role with respect to said portal, and wherein said building is a building network and said communications network is the Internet;
   said server device further including a first receiving module operable to receive one or more requests from a plurality of vendors of a variety of commercial services and products to be associated with the portal, wherein being associated with the portal includes being identified on a list of vendors of a specified category from which a tenant of the building can select, the category of vendors being determined by the manager;
   the server device further including a second receiving module operable to receive one or more orders for at least one commercial service or product of a specified vendor from a tenant;
   an approval module operable to receive approval or denial of said orders based on one or more order parameters of said tenant;
   a first transmitting module operable to forward the one or more orders to the specified vendor if approval is received in the approval module, wherein the first transmitting module does not forward said orders to the specified vendor if the order is denied;
   a second transmitting module operable to provide tenant with status information of said orders during the pendancy of said orders; and
   a database operable to store a tenant profile for each tenant and a vendor profile for each vendor.

* * * * *